(12) United States Patent
Jerg et al.

(10) Patent No.: US 9,055,854 B2
(45) Date of Patent: Jun. 16, 2015

(54) WATER-GUIDING HOUSEHOLD APPLIANCE COMPRISING A SELF-CLEANING FILTER

(75) Inventors: Helmut Jerg, Giengen (DE); Thomas Wachinger, Hohenzell (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1087 days.

(21) Appl. No.: 12/682,786

(22) PCT Filed: Oct. 15, 2008

(86) PCT No.: PCT/EP2008/063861
§ 371 (c)(1),
(2), (4) Date: Apr. 13, 2010

(87) PCT Pub. No.: WO2009/056444
PCT Pub. Date: May 7, 2009

(65) Prior Publication Data
US 2010/0243006 A1    Sep. 30, 2010

(30) Foreign Application Priority Data

Oct. 31, 2007 (DE) .......................... 10 2007 052 074

(51) Int. Cl.
*A47L 15/42* (2006.01)
*B01D 29/01* (2006.01)
*B01D 29/11* (2006.01)
*D06F 39/10* (2006.01)

(52) U.S. Cl.
CPC ........... *A47L 15/4208* (2013.01); *B01D 29/014* (2013.01); *B01D 29/114* (2013.01); *D06F 39/10* (2013.01)

(58) Field of Classification Search
CPC .................................................. A47L 15/4208
See application file for complete search history.

(56) References Cited

U.S. PATENT DOCUMENTS

| | | | | |
|---|---|---|---|---|
| 3,179,116 A | * | 4/1965 | Jacobs | 134/56 D |
| 3,985,656 A | * | 10/1976 | Arvanitakis | 210/327 |
| 5,554,284 A | * | 9/1996 | Bartelt et al. | 210/356 |
| 5,853,584 A | | 12/1998 | Solbakke et al. | |
| 7,040,490 B2 | * | 5/2006 | Jerg | 210/498 |
| 2004/0050774 A1 | * | 3/2004 | Jerg | 210/498 |
| 2007/0228309 A1 | | 10/2007 | Friedman et al. | |
| 2009/0283111 A1 | * | 11/2009 | Classen et al. | 134/10 |

FOREIGN PATENT DOCUMENTS

| | | | | |
|---|---|---|---|---|
| DE | 4131914 C2 | 9/1997 | | |
| DE | 10244243 A1 | 3/2004 | | |
| EP | 0752231 A1 | 1/1997 | | |
| EP | 0752231 A1 * | 1/1997 | | A47L 15/42 |
| WO | 9532785 A1 | 12/1995 | | |
| WO | WO2007/017330 A1 * | 2/2007 | | B01D 29/66 |

* cited by examiner

*Primary Examiner* — Michael Barr
*Assistant Examiner* — Jason Riggleman
(74) *Attorney, Agent, or Firm* — James E. Howard; Andre Pallapies

(57) ABSTRACT

A water-guiding household appliance that includes a filter arranged in a line system, the filter including at least one filter element; and a base body, wherein the at least one filter element is secured to the base body in a pivotable manner at a rotation point and structured to be moved between a filter position and a cleaning position.

31 Claims, 2 Drawing Sheets

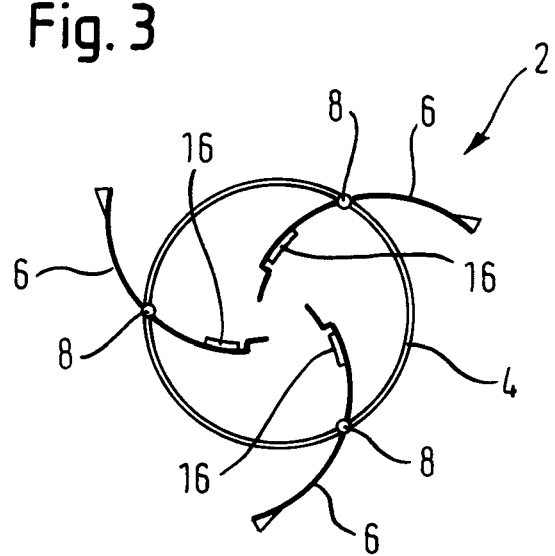
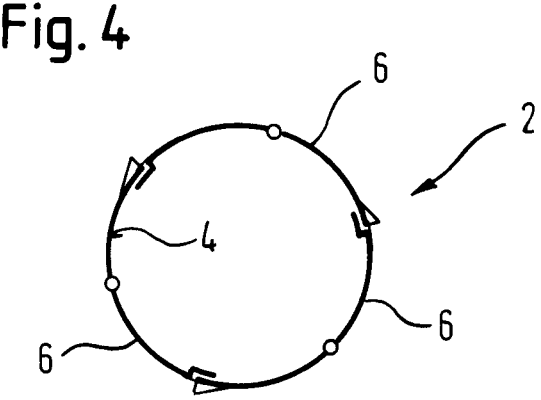

WATER-GUIDING HOUSEHOLD APPLIANCE COMPRISING A SELF-CLEANING FILTER

BACKGROUND OF THE INVENTION

The invention relates to a water-guiding household appliance, in particular a dishwasher or washing machine, at least having a filter arranged in a line system.

In water-guiding household appliances, such as dishwashers for example, wash liquor is circulated in a line system during a cleaning operation for the items to be washed, in other words wash liquor collects in a pump sump arranged in the lower region of the dishwasher and is fed to the spray arms through a line system by means of a pump, said spray arms subjecting the items to be washed, which are arranged in the interior of the dishwasher, to the action of wash liquor. To prevent blockages of the line system, it is known to retain dirt particles of a minimum size by means of a filter. Various measures are known from the prior art to counteract filter blockage due to filter cake formation.

For example it is known from DE 413 19 14 C2 to set an essentially cylindrical filter in rotational motion to spin off the filter cake by means of the resulting centrifugal forces.

In contrast it is known from WO 2007/017330 A1 to clean a filter of a household dishwasher after the end of a cleaning operation in which wash liquor is circulated and flowed through the filter in a first direction by pumping the wash liquor through the filter during the pumped discharge operation in a second direction, which is counter to the first direction, thereby cleaning it by means of a reverse wash operation.

It is also known from DE 10 244 243 A1 to clean a filter by cleaning said filter by means of a spray facility provided for the purpose.

However the solutions known from the prior art have a complicated structure. The object of the invention is therefore to provide a water-guiding household appliance having a filter which is characterized by a simple structure and a reliable mode of operation.

BRIEF SUMMARY OF THE INVENTION

The object of the invention is based on a water-guiding household appliance, in particular a dishwasher or washing machine, at least comprising a filter arranged on a line system. In the case of a dishwasher the line system can be a line that serves to supply wash liquor to spray arms arranged in the spray chamber of a dishwasher. To this end the spray arms are connected by way of lines to a pump, which takes in the wash liquor that collects in the base region of a pump sump arranged in the wash compartment and circulates it in a closed circuit during the cleaning operation for the items to be washed.

The object of the invention is achieved in that the filter comprises at least one filter element, which is arranged in such a way that it can be moved between a first filter position and a second cleaning position. A water-guiding household appliance is thus provided with a filter that can clean itself in a surprisingly simple fashion without particular facilities being required for the purpose. This is achieved in that the filter can assume two positions, with the filter action of the filter being provided in a first position and it being possible for the filter to be cleaned in a second position or cleaning position.

In a first preferred embodiment provision is made for the at least one filter element to be able to be moved from the first filter position to the second cleaning position and/or vice versa by means of a flow reversal of a liquid flowing through the filter. It is thus possible to bring about a change from the first filter position to the second cleaning position or a change from the second cleaning position to the first filter position and a change in both directions by means of a flow reversal. The flow reversal here can for example be a flow reversal that takes place during a pumped discharge operation counter to the flow direction when the wash liquor is being circulated during a cleaning operation. Provision can be made for the liquid flowing through the filter to rotate, for example clockwise, as a result of which the filter element is moved into the first filter position, and during pumped discharge of the wash liquor to rotate counterclockwise.

To prompt the movement of the filter elements between the first filter position and the second cleaning position, as brought about by the flow reversal, provision can be made for the at least one filter element to have at least one inflow wedge, which in the presence of a correspondingly directed flow, causes the at least one filter element to move from a first filter position to the second cleaning position and vice versa.

To prompt the reversed movement of the at least one filter element, provision can be made for correspondingly arranged further inflow wedges. However provision is preferably made for the filter elements to be spring-pretensioned in a corresponding direction, so that for example, when no counter-clockwise rotating flow, as occurs during the pumped discharge operation is present, the filter elements return automatically to the first filter position.

In a preferred second embodiment of the invention provision is made for an actuator to be provided, which is actively connected to the at least one filter element. This makes it possible, by specific control of the actuator, to prompt the filter elements to change from the first filter position to the second cleaning position or vice versa. It is thus possible to bring about for example a change from the first filter position to the second cleaning position or a change from the second cleaning position to the first filter position. A change in both directions can also be possible. The actuator can be used here for example to move the filter element from the second cleaning position into the first filter position, while the movement from the first filter position into the second cleaning position is brought about by the flow acting on the at least one filter element or the filter elements are spring-pretensioned to bring about this movement.

Provision is preferably made here for the actuator to have a memory wire. The actuator therefore has a simple structure that operates reliably. In one preferred embodiment provision is made for the memory wire to be configured in a ring shape. In other words in the activated state the memory wire is shortened, thereby reducing the radius of the ring-shaped memory wire. The ring-shaped memory wire here is actively connected to the at least one filter element and hereby brings about a change from a first filter position to the second cleaning position and/or vice versa.

In a third preferred embodiment provision is made for it to be possible to move the at least one filter element from the first filter position to the second cleaning position and/or vice versa by a movement of the filter from a first position to the second position and/or vice versa. This allows a particularly simple structure as it is not the elements that are arranged in a movable manner on the filter that are moved but the filter itself. It is thus possible to bring about a change from the first filter position to the second cleaning position or a change from the second cleaning position to the first filter position. A change in both directions can also be possible.

Provision is preferably made here for the movement to be a rotational movement. It does not however have to be a complete rotational movement of the filter with a number of rotations about its own axis; instead the filter is simply rotated through a defined angle which is smaller than 360°. It is however also possible to configure the filter so that the at least one filter element can be moved from the first filter position to a second cleaning position and/or vice versa by means of a linear movement.

Provision is preferably made here for the rotational movement to generate a centrifugal force acting on the at least one filter element. A particularly simple structure is thus achieved that requires no pivoting of the at least one filter element at the filter. To this end weights can be arranged at corresponding points on the at least one filter element, so that a corresponding movement prompts a change of the position of the at least one filter element from a first filter position to a second cleaning position and vice versa.

Provision is preferably also made for the filter to be configured essentially in the manner of a cylindrical sleeve. Provision is preferably made here for at least one filter element to form a segment of the filter that is configured essentially in the manner of a cylindrical sleeve. Provision is also preferably made for a number of filter elements, in particular filter elements of identical structure, to be provided, forming a filter surface essentially in the manner of a cylindrical sleeve.

The invention also encompasses a filter for an inventive water-guiding household appliance, such as a dishwasher or washing machine for example.

BRIEF DESCRIPTION OF THE DRAWINGS

The invention is described below with reference to a drawing, in which:

FIG. 3 shows a schematic diagram of a third exemplary embodiment of an inventive filter for a water-guiding household appliance, FIG. 4 shows a schematic diagram of a filter for a water-guiding household appliance in the filter position.

DETAILED DESCRIPTION OF EXEMPLARY EMBODIMENTS OF THE PRESENT INVENTION

Figure 1:
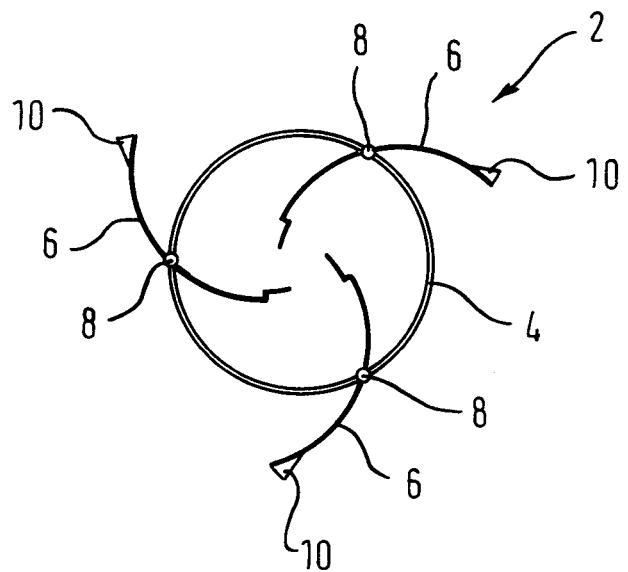
FIG. 1 shows a schematic diagram of a first exemplary embodiment of a filter for a water-guiding household appliance.
Figure 2:
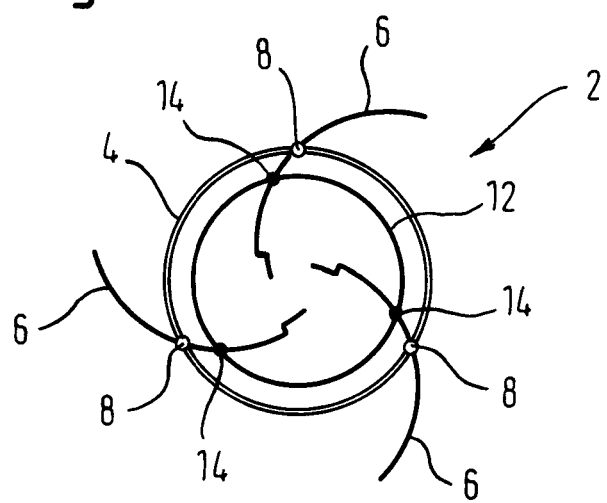
FIG. 2 shows a schematic diagram of a second exemplary embodiment of an inventive filter for a water-guiding household appliance.

Reference is made to FIGS. 1 to 4.

A water-guiding household appliance (not shown), such as a dishwasher for example, has a line system (not shown), which can be used to supply wash liquor to spray arms (not shown) arranged in a treatment compartment of a dishwasher. The spray arms are connected by means of a line (not shown) to a sump (not shown) arranged in the base region of the receiving compartment of the water-guiding household appliance, a pump (not shown) being provided to convey the wash liquor from the sump through the line to the spray arms. To retain dirt particles of a minimum size, so that they do not block the outlet openings of spray arms for example, a filter 2 is arranged in the sump.

The filter 2 has an essentially cylindrical basic form with a base body 4, to which three filter elements 6 are secured in a pivotable manner at rotation points 8. The three filter elements 6 here are configured so that in the first filter position (see FIG. 4) they form a cylindrical sleeve surface, through which the wash liquor passes, for example when the wash liquor is circulated and supplied to the spray arm during a cleaning operation. The water-guiding household appliance, for example a dishwasher, is configured here so that in this operating state the flowing liquid has a clockwise rotation.

To clean the filter 2 however a flow reversal is effected, in other words the filter 2 is subjected to a flow that has a counterclockwise rotation. In this process inflow wedges arranged on the three filter elements 6 cause the flow in this direction to pivot the filter elements 6 into a second position, the cleaning position (see FIG. 1), in which a filter cake can be detached from the surface of the filter elements 6 and be disposed of for example by means of a drain pump into a house-side waste water disposal system.

To bring about a return of the three filter elements 6 from the second cleaning position to the first filter position, the inflow wedges can be configured so that they are moved correspondingly from the second cleaning position to the first filter position when a liquid flows clockwise. Alternatively the three filter elements 6 can also be supported with spring-pretensioning or an actuator can also be provided for this purpose.

In a second exemplary embodiment provision is made for the three filter elements 6 that are secured to a cylindrical base body 4 in such a manner that they can be rotated at rotation points 8, also to be actively connected at securing points 14 to a memory wire 12 that is configured in a ring shape. A reduction of the length of the memory wire here brings about a reduction of the diameter of the ring-shaped memory wire 12 (see FIG. 2) so that the three filter elements 6 are moved from the first filter position into the second cleaning position by pivoting at the securing points. To accelerate the return of the three filter elements 6 from the second cleaning position to the first filter position, the three filter elements can be spring-pretensioned or a second actuator is used.

In a third exemplary embodiment the three filter elements have weights 16 on the base body 4 at the rotation points 8, said weights 16 being arranged so that centrifugal forces are generated during a rotational movement of the base body 4 about an axis of rotation, said centrifugal forces causing the three filter elements 6 to be moved from the first filter position into the second cleaning position. To this end provision can be made for the base body 4 not to be able to rotate completely, in other words not to be configured to rotate a plurality of times about its own axis of rotation but simply to move in a rotating manner through a defined angle, which is smaller than 360°. To move the three filter elements 6 back from the second cleaning position into the first filter position, a corresponding rotational movement of the base body 4 can generate a correspondingly directed centrifugal force or the three filter elements 6 can be spring-pretensioned or an actuator can be used for the purpose, which is actively connected to the three filter elements 6.

LIST OF REFERENCE CHARACTERS

2 Filter
4 Base body
6 Filter element
8 Rotation point
10 Inflow wedge
12 Memory wire
14 Securing point
16 Weight

The invention claimed is:
1. A water-guiding appliance, comprising:
a filter arranged in a line system, the filter comprising at least one filter element; and a substantially cylindrical base body, wherein the at least one filter element is secured to the base body in a pivotable manner at a rotation point substantially at a center point of the at least one filter element and structured to be rotated at the rotation point between a filter position and a cleaning position.

2. The water-guiding appliance as claimed in claim 1, wherein the at least one filter element is moved from the filter position to the cleaning position and vice versa by flow reversal of a liquid flowing through the filter.

3. The water-guiding appliance as claimed in claim 1, wherein the at least one filter element includes at least one inflow wedge.

4. The water-guiding appliance as claimed in claim 1, wherein the at least one filter element is spring-pretensioned.

5. The water-guiding appliance as claimed in claim 1, further comprising an actuator actively connected to the at least one filter element and operable to move the at least one filter element from the filter position to the cleaning position and vice versa.

6. The water-guiding appliance as claimed in claim 1, wherein the at least one filter element is moved from the filter position to the cleaning position and vice versa by a movement of the filter from a first position to a second position and vice versa.

7. The water-guiding appliance as claimed in claim 6, wherein the movement is a rotational movement.

8. The water-guiding appliance as claimed in claim 7, wherein the rotational movement generates a centrifugal force acting on the at least one filter element.

9. The water-guiding appliance as claimed in claim 1, wherein the filter is structured as a cylindrical sleeve.

10. The water-guiding appliance as claimed in claim 9, wherein the at least one filter element forms a segment of the filter that is structured as the cylindrical sleeve.

11. The water-guiding appliance as claimed in claim 10, wherein a plurality of filter elements form a filter surface of the filter that is structured as the cylindrical sleeve.

12. The water-guiding appliance as claimed in claim 1, wherein the water-guiding household appliance comprises a dishwasher.

13. The water-guiding appliance as claimed in claim 12, wherein the dishwasher comprises: spray arms; a treatment compartment; a sump; and a pump, wherein the line system supplies washing liquor to the spray arms and the spray arms are arranged in the treatment compartment of the dishwasher, wherein the spray arms are connected by a line to the sump arranged in a base region of the treatment compartment, and wherein the pump conveys the wash liquor from the sump through the line to the spray arms.

14. The water-guiding appliance as claimed in claim 1, wherein the water-guiding household appliance comprises a washing machine.

15. The water-guiding appliance as claimed in claim 13, wherein the filter is arranged in the sump.

16. The water-guiding appliance as claimed in claim 1, wherein the filter comprise three filter elements.

17. The water-guiding appliance as claimed in claim 1, wherein in the filter position the at least one filter element forms a cylindrical sleeve surface, through which wash liquor passes.

18. The water-guiding appliance as claimed in claim 2, wherein moving the at least one filter to the cleaning position comprises effecting a flow reversal from a clockwise rotation to a counterclockwise rotation.

19. The water-guiding appliance as claimed in claim 3, wherein moving the at least one filter element from the filter position to the cleaning position, comprises the at least one inflow wedge being acted on by a liquid flow causing the at least one filter element to pivot and move from the filter position to the cleaning position.

20. The water-guiding appliance as claimed in claim 19, wherein the liquid flow is in a counterclockwise direction.

21. The water-guiding appliance as claimed in claim 1, wherein filter cake detached from the surface of the at least one filter element while in the cleaning position is disposed of via a drain pump into a house-side waste water disposal system.

22. The water-guiding appliance as claimed in claim 3, wherein returning the at least one filter element from the cleaning position to the filter position, comprises the at least one inflow wedge being acted on by a liquid flow causing the at least one filter element to pivot and move from the cleaning position to the filter position.

23. The water-guiding appliance as claimed in claim 22, wherein the liquid flow is in a clockwise direction.

24. The water-guiding appliance as claimed in claim 8, wherein the at least one filter element further comprises a weight.

25. The water-guiding appliance as claimed in claim 7, wherein the base body rotates about its own axis of rotation through a defined angle which is less than 360°.

26. The water-guiding appliance as claimed in claim 24, wherein the at least one filter element is spring-pretensioned.

27. The water-guiding appliance as claimed in claim 24, the at least one filter element further comprising an actuator actively connected to the at least one filter element.

28. A water-guiding appliance, comprising: a filter arranged in a line system, the filter comprising at least one filter element; a base body, wherein the at least one filter element is secured to the base body in a pivotable manner at a rotation point and structured to be moved between a filter position and a cleaning position; and an actuator actively connected to the at least one filter element and operable to move the at least one filter element from the filter position to the cleaning position and vice versa, wherein the actuator includes a memory wire.

29. The water-guiding appliance as claimed in claim 28, wherein the memory wire is structured in a ring shape.

30. The water-guiding appliance as claimed in claim 29, wherein the at least one filter element is additionally actively connected to the memory wire, such that reducing the length of the memory wire to reduce the diameter of the ring-shaped memory wire causes the at least one filter element to move from the filter position into the cleaning position.

31. A filter for a water-guiding appliance, the filter comprising at least one filter element; and a substantially cylindrical base body, wherein the at least one filter element is secured to the base body in a pivotable manner at a rotation point substantially at a center point of the at least one filter element and structured to be rotated at the rotation point between a filter position and a cleaning position.

* * * * *